United States Patent

Underwood

[11] Patent Number: 5,975,123
[45] Date of Patent: Nov. 2, 1999

[54] GAS VALVE WEATHER CAP

[76] Inventor: Joseph Linter Underwood, 4575 170th St., Hugo, Minn. 55038

[21] Appl. No.: 09/049,351

[22] Filed: Mar. 27, 1998

[51] Int. Cl.[6] .................................................. F16K 27/12
[52] U.S. Cl. ........................................ 137/382; 137/377
[58] Field of Search .................................... 137/377, 382

[56] References Cited

U.S. PATENT DOCUMENTS

| | | | |
|---|---|---|---|
| 1,782,150 | 11/1930 | Shrum . | |
| 2,707,968 | 5/1955 | Efford | 137/382 |
| 2,919,721 | 1/1960 | Isenberg | 138/64 |
| 3,038,633 | 6/1962 | Foster | 137/382 |
| 3,104,681 | 9/1963 | Gray, Jr. | 138/96 |
| 3,203,577 | 8/1965 | Parker | 220/42 |
| 3,317,069 | 5/1967 | Chin | 215/47 |
| 3,450,299 | 6/1969 | Barbera | 220/42 |
| 3,574,312 | 4/1971 | Miller | 138/96 |
| 4,164,241 | 8/1979 | Kubo | 137/377 |
| 4,170,316 | 10/1979 | Labarbera | 220/306 |
| 4,202,378 | 5/1980 | Bush et al. | 138/96 |
| 4,269,232 | 5/1981 | Witschi | 138/96 |
| 4,342,337 | 8/1982 | Underwood | 138/96 |
| 4,616,763 | 10/1986 | Ruhl | 137/382 |
| 5,603,869 | 2/1997 | McNew et al. | 137/382 |

*Primary Examiner*—A. Michael Chambers
*Attorney, Agent, or Firm*—Jacobson & Johnson

[57] ABSTRACT

A one-piece weather cap that can be installed or removed from a gas valve without the aid of tools, with the one-piece weather cap having a flexible and resilient neck with dimples and a circular band that frictionally engage an extension on the gas valve to frictionally hold the weather cap on the gas valve during adverse weather conditions, with an annular skirt that extends in a cantilevered fashion radially outward from the neck to protect the gas vent in the valve from becoming obstructed with snow or ice.

18 Claims, 3 Drawing Sheets

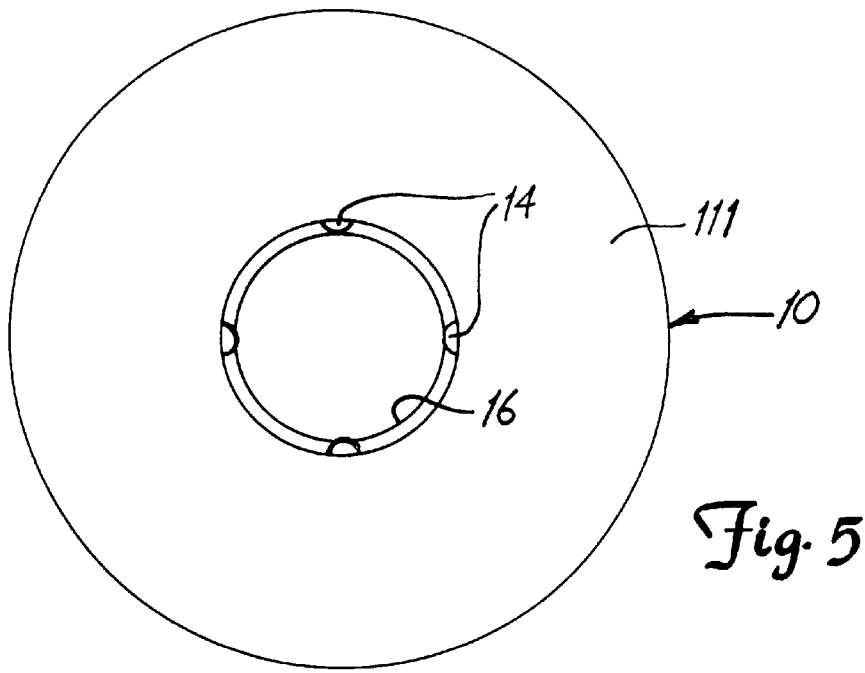
Fig. 5
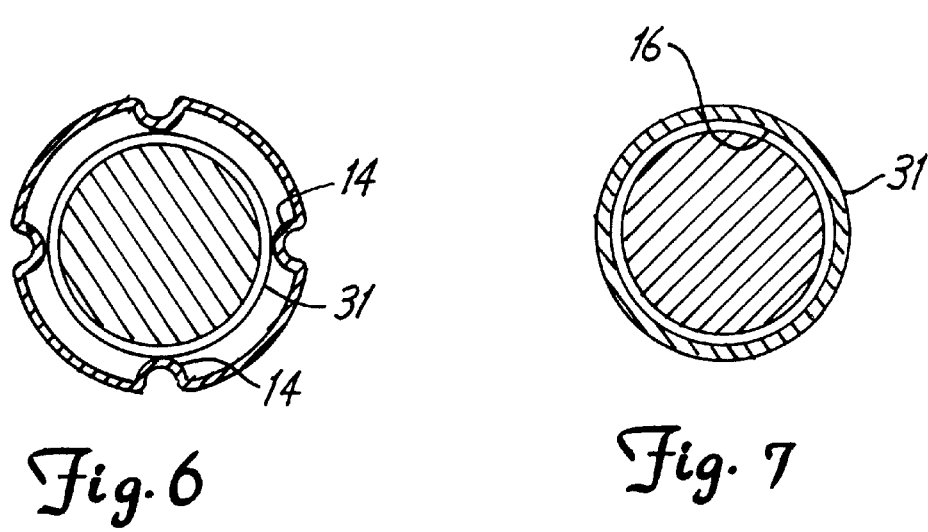
Fig. 6
Fig. 7

GAS VALVE WEATHER CAP

FIELD OF THE INVENTION

This invention relates generally to gas valves covers and more specifically to a gas valve weather cap that prevents moisture from obstructing the vent in gas valve.

BACKGROUND OF THE INVENTION

The concept of gas valves is well known in the art, typically these gas valves have an inlet and an outlet with a diaphragm chamber that is vented to the atmosphere to allow the diaphragm to move within the gas valve. The flow of gas though the gas valve is controlled by the diaphragm within the gas valve. In winter climates, the gas vent can become clogged with snow or ice which prevents the gas valve from operating properly. The present invention comprises a one-piece weather cap that can be installed on an existing valve without the use of tools to prevent the gas vent from becoming clogged with snow, ice, or other forms of moisture. The one-piece weather cap allows the gas vent to breathe and is held on to the gas valve through a frictional and flexible neck that engages a portion of the valve, while the other portions of the valve including the gas vent are shielded by a skirt that is cantilevered radially outward from the neck of the weather cap. A further feature of the invention is that one can make adjustments to the valve simply by slipping the weather cap off the valve to thereby expose the valve.

DESCRIPTION OF THE PRIOR ART

U.S. Pat. No. 1,782,150 shows a valve protector that includes cylindrical cups which are held over the valve ends by wire.

U.S. Pat. No. 2,919,721 discloses a plastic cap for sealing around a conduit.

U.S. Pat. No. 3,104,681 discloses a plastic closure cap for inserting onto the end of fittings used in refrigeration systems.

U.S. Pat. No. 3,230,577 discloses a container cap that includes radial projections extending inward from the inside of the cap to grip the container.

U.S. Pat. No. 3,317,069 discloses a bottle cap that also functions as a stand so that thick liquids can be drained out of the bottle.

U.S. Pat. No. 3,450,299 discloses a cap with projections for engaging the neck of a bottle.

U.S. Pat. No. 3,574,312 discloses a plug for closing the end of a pipe, with the plug engaging a threaded surface on the pipe.

U.S. Pat. No. 4,170,316 discloses a cap for sealing an aerosol bottle or the like with the cap having inwardly extending projections that extend inward from the inside wall of the cap.

U.S. Pat. No. 4,202,378 discloses safety cap for rebar to prevent the sharp edges of the rebar from injuring a worker.

U.S. Pat. No. 4,269,232 shows a protective cap for a pipe that includes a ventilating port.

U.S. Pat. No. 4,342,337 discloses a protective closure that includes threads for holding the protective closure in place.

SUMMARY OF THE INVENTION

Briefly, the invention comprises a one-piece weather cap that can be installed or removed from a gas valve without the aid of tools, with the one-piece resilient weather cap having a neck with dimples and a peripheral protrusion that frictionally engages an extension on the gas valve to hold the weather cap on the gas valve while an annular skirt extends in a cantilevered fashion radially outward from the neck to protect the gas vent in the valve from becoming obstructed with snow or ice.

BRIEF DESCRIPTION OF THE DRAWINGS

FIG. 5 is a bottom view of the weather cap showing the integral dimples that project radially inward to frictionally engage the gas valve;

FIG. 6 is a cross-sectional view taken along lines 6—6 of FIG. 3 to show the dimples frictionally engaging the extension of the gas valve; and FIG. 7 is a cross-sectional view taken along lines 7—7 of FIG. 3 to show the circular band forming 360 degree frictional contact with the extension of gas valve.

DESCRIPTION OF THE PREFERRED EMBODIMENT

Figure 1:
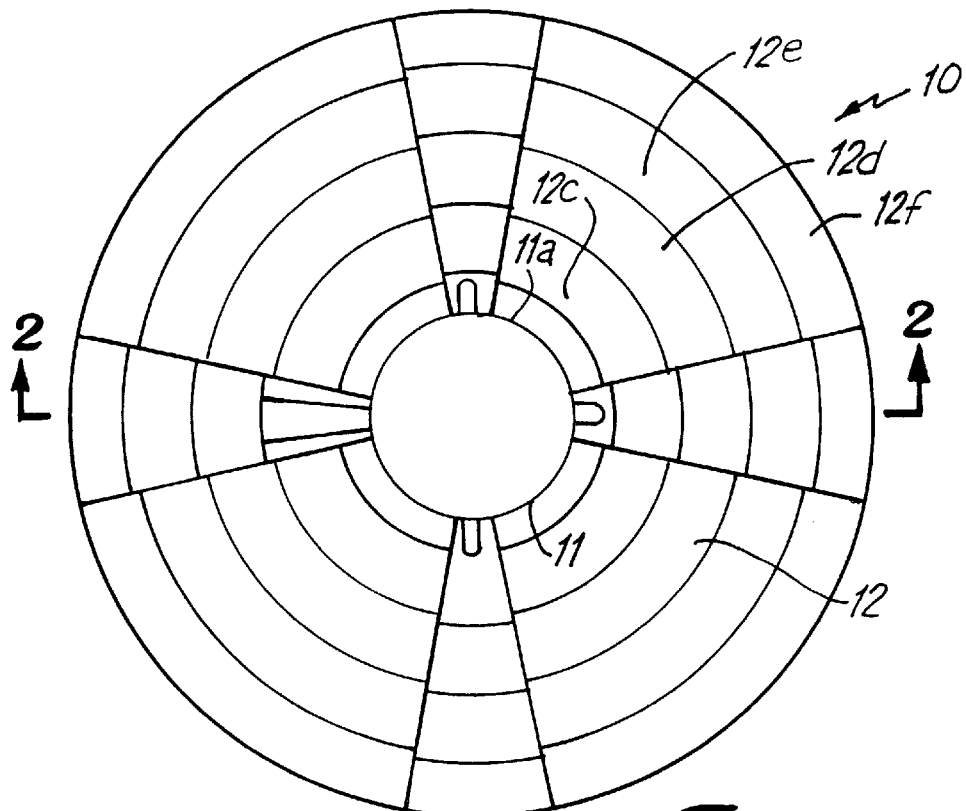
FIG. 1 is a top view of a one-piece weather cap for frictional mounting on a gas valve.
Figure 2:
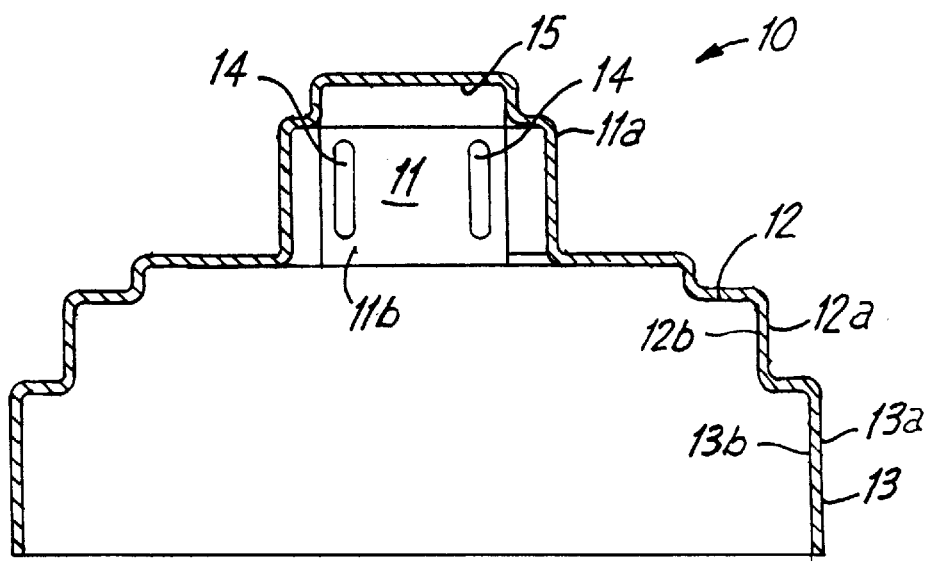
FIG. 2 is a cross-sectional view taken along lines 2—2 of FIG. 1.

FIG. 1 and FIG. 2 show a one-piece weather cap 10 for frictional mounting on a gas valve housing. Weather cap 10 includes a hollow cylindrical neck 11 having an annular skirt 12 cantilevered therefrom with the peripheral region of the annular skirt 12 having a downward extending flange 13. Located in cylindrical neck 11 are dimples 14 which are integrally formed in the weather cap 10. Located about dimples 14 is a circular band or projection 15 that has its innermost portions located in substantially a cylindrical surface that extends through the innermost projections of dimples 14. In the embodiment shown, weather cap 10 is molded in a single piece and is made of polyethylene. The thickness of the weather cap is about $\frac{1}{32}$ of an inch so as to provide both flexibility and stiffness as opposed to rigidity. That is, by making the weather cap of relatively thin material the weather cap can bend and flex which allows one to force the weather cap onto a rigid post on a gas valve. Weather cap 10 is shown in FIG. 1 and FIG. 2 to have the skirt 12 include a series of steps 12c, 12d, 12e and 12f as the skirt angles downward from the neck of the weather cap 10. The purpose of forming steps, is that the molding of the weather cap is enhanced as the weather cap can easily be removed from the mold.

The present invention provides a one-piece weather cap 10 for hand installation on a gas valve to prevent the gas valve from malfunctioning due to adverse weather conditions such as snow and ice which can accumulate on the valve and plug the gas valve vent. The weather cap 10 includes a cylindrical neck 11 having an exterior surface 11a and an inside surface 11b. A set of dimples 14 are integrally formed in neck 11, with dimples 14 projecting radially inward to resiliently secure neck 11 to a gas valve extension. Connected to neck 11 is annular skirt 12 which is cantilevered outward and downward from neck 11, with skirt 12 having an exterior surface 12a for deflecting moisture therefrom, and an interior surface 12b for shielding a gas vent valve thereunder. Integrally connected to skirt 12 is annular flange 13 that extends downward from skirt 12 with flange 13 having an exterior surface 13a for deflecting moisture therefrom, with neck surface 11a, skirt exterior surface 12a and flange exterior surface 13a forming a contiguous one-piece exterior surface to allow moisture to run off the weather cap 10 while the region underneath remains free of moisture.

Figure 3:
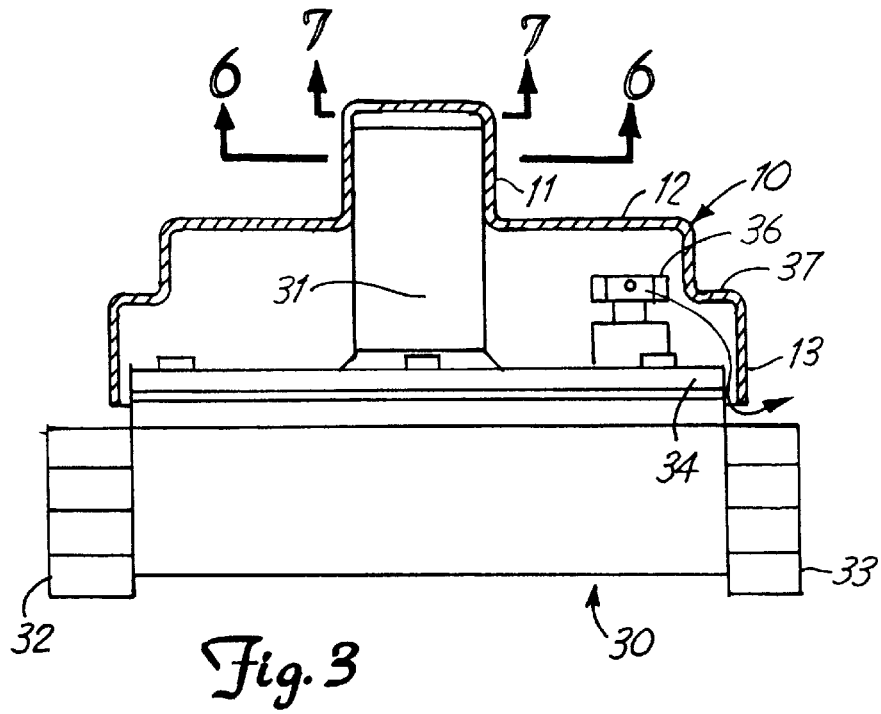
FIG. 3 is side view of a gas valve with a one-piece weather cap shown in section and frictionally mounted on the gas valve.

FIG. 3 is side view of a gas valve 30 with a one-piece weather cap shown in section and frictionally mounted upon housing extension 31. Gas valve 10 includes an inlet 32 for connecting to a gas supply and an outlet 33 for connecting to a unit to be supplied with gas. Extending upward from housing base 34 is a gas vent 36 which comprises a hollow stud having a vent hole 37 therein for allowing air to enter or leave vent hole 37. An arrow extends outward and around flange 13 to illustrate how the air can be vented to the atmosphere while the weather cap 10 is located on gas valve 10. The weather cap 10 is shown with neck 11 engaging the rigid housing extension 31 and the skirt 12 cantilevered outwardly from the neck 11, with the skirt terminating in a downward extending flange 13. In a gas valve, it is vent hole 37 that can become plugged and alter the operation of the gas valve.

To place weather cap 10 on gas valve 30, the user merely pushes downward on weather cap 10 as the weather cap is concentrically positioned over housing extension 31. While housing extension 31 is rigid, the flexible and resilient neck 11 of weather cap flexes sufficiently to fit snugly around the extension so that the weather cap can not be easily removed.

Figure 4:
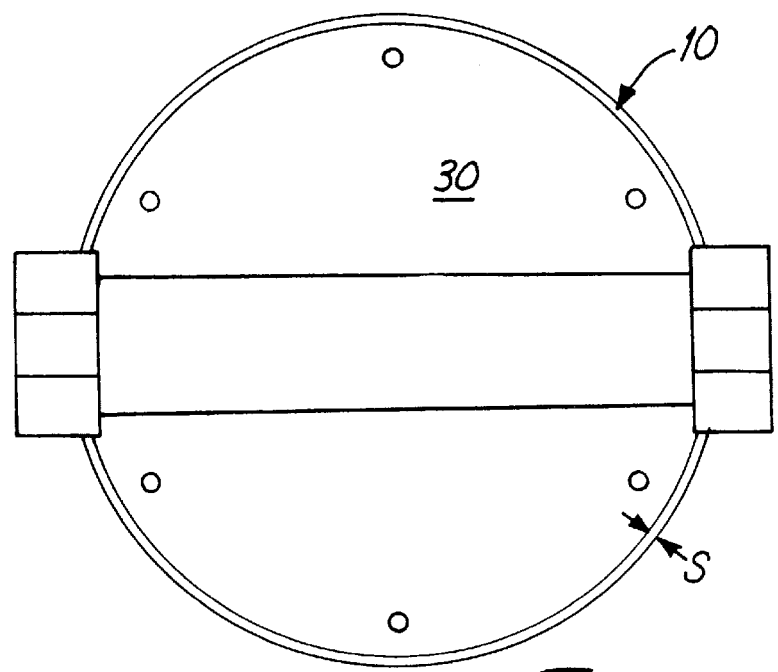
FIG. 4 is a bottom view of the gas valve and weather cap of FIG. 3.

FIG. 4 is a bottom view of the gas valve 30 showing that weather cap 10 extends radially outward of gas valve 30 a distance denoted by "s" which is about ⅛th of an inch to thereby provide an annular passage for ingress and egress of air from beneath weather cap 10.

FIG. 5 is a bottom view of the weather cap 10 showing the integral dimples 14 and integral band 14 that are located inside the weather cap and project radially inward to frictionally engage a gas valve housing.

FIG. 6 is a cross-sectional view showing the dimples 14 engaging the extension 31 of the gas valve 10.

FIG. 7 is a cross-sectional view showing the circular band 16 forming 360 degree contact with the extension 31 of gas valve 10.

I claim:

1. A one-piece weather cap for hand installation on a gas valve to prevent the gas valve from malfunctioning due to adverse weather conditions comprising:

a neck having an exterior surface and an inside surface, said neck comprising a resilient material, a set of dimples integrally formed in said neck with said dimples projecting radially inward to resiliently secure said neck to a gas valve extension;

a skirt cantilevered outward from said neck with said skirt having an exterior surface for deflecting moisture therefrom and an interior surface for shielding a gas vent valve thereunder, a flange extending downward from said skirt, said flange having an exterior surface for deflecting moisture therefrom with said neck, said skirt and said flange exterior surfaces forming a continuous, one-piece exterior surface to allow moisture to run off the weather cap so that the inside of the skirt remains free of moisture.

2. The one-piece weather cap of claim 1 wherein the resilient material is polyethylene having a thickness of about ⅟32 of an inch.

3. The one-piece weather cap of claim 1 wherein the neck includes a circumferential band with said circumference band projects radially inward to form a support for said neck.

4. The one-piece weather cap of claim 1 wherein the set of dimples includes at least three dimples.

5. The one-piece weather cap of claim 1 wherein the skirt extends at a downward angle from said neck.

6. The one-piece weather cap of claim 1 wherein the flange extends downward from said skirt.

7. The one-piece weather cap of claim 1 wherein the neck and the skirt are located in a substantially coaxial alignment with each other.

8. The one-piece weather cap of claim 1 wherein the skirt includes a stepped surface.

9. The one-piece weather cap of claim 1 wherein the resilient material is sufficiently thin so as to be flexible.

10. In combination:

a gas valve having a cylindrical extension and an inlet and an outlet for directing gas therethrough and a vent valve for venting air from the interior of the gas valve to enable the gas valve to deliver gas therethrough;

a one-piece weather cap for installation on the gas valve without the aid of tools to thereby prevent the gas valve from malfunctioning due to adverse weather conditions, with the weather cap having a neck having an exterior surface and an inside surface, said neck comprising a resilient material, a set of dimples integrally formed in said neck with said dimples projecting radially inward to resiliently secure said neck to the cylindrical extension of said gas valve, said one-piece weather cap including a skirt cantilevered outward from said neck with said skirt having an exterior surface for deflecting moisture therefrom and an interior surface for shielding a gas vent thereunder, with said interior surface spaced from said gas vent to permit free flow of air in and out of said gas vent while maintaining a weather shield over the gas vent to prevent the gas vent from becoming obstructed due to rain or snow.

11. The combination of claim 10 including:

a flange extending downward from said skirt, said flange having an exterior surface for deflecting moisture therefrom with said neck, said skirt and said flange exterior surfaces forming a continuous one-piece exterior surface to allow moisture to run off the weather cap so that the inside of the skirt remains free of moisture.

12. The combination of claim 10 wherein the resilient material is polyethylene.

13. The combination of claim 12 wherein the neck includes a circumferential band with said circumference band projecting radially inward to form a support for said neck.

14. The combination of claim 13 wherein the set of dimples includes at least three dimples.

15. The combination of claim 14 wherein the skirt extends at a downward angle from said neck.

16. The combination of claim 15 wherein the flange extends downward from said skirt.

17. The combination of claim 16 wherein the neck and the skirt are located in a substantially coaxial alignment with each other.

18. The combination of claim 17 wherein the skirt includes a stepped surface.

* * * * *